US008656228B2

(12) United States Patent
Check et al.

(10) Patent No.: US 8,656,228 B2
(45) Date of Patent: Feb. 18, 2014

(54) MEMORY ERROR ISOLATION AND RECOVERY IN A MULTIPROCESSOR COMPUTER SYSTEM

(75) Inventors: Mark A. Check, Hope Junction, NY (US); David F. Craddock, New Paltz, NY (US); Thomas A. Gregg, Highland, NY (US); Pak-kin Mak, Poughkeepsie, NY (US); Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/821,271

(22) Filed: Jun. 23, 2010

(65) Prior Publication Data

US 2011/0320892 A1     Dec. 29, 2011

(51) Int. Cl.
*G06F 11/00*     (2006.01)

(52) U.S. Cl.
USPC ............................... 714/54; 714/42; 714/723

(58) Field of Classification Search
USPC .............................................. 714/54, 42, 723
See application file for complete search history.

(56) References Cited

U.S. PATENT DOCUMENTS

| | | | |
|---|---|---|---|
| 4,104,539 A | 8/1978 | Hase | |
| 4,611,319 A | 9/1986 | Naito | |
| 4,644,443 A | 2/1987 | Swensen et al. | |
| 5,027,254 A | 6/1991 | Corfits et al. | |
| 5,170,472 A | 12/1992 | Cwiakala et al. | |
| 5,282,274 A | 1/1994 | Liu | |
| 5,430,856 A | 7/1995 | Kinoshita | |
| 5,438,575 A * | 8/1995 | Bertrand | 714/799 |
| 5,465,332 A | 11/1995 | Deloye et al. | |
| 5,465,355 A | 11/1995 | Cook et al. | |
| 5,535,352 A | 7/1996 | Bridges et al. | |
| 5,551,013 A | 8/1996 | Beausoleil et al. | |
| 5,568,365 A | 10/1996 | Hahn et al. | |
| 5,574,873 A | 11/1996 | Davidian | |
| 5,600,805 A | 2/1997 | Fredericks et al. | |
| 5,617,554 A | 4/1997 | Alpert et al. | |
| 5,663,919 A | 9/1997 | Shirley et al. | |

(Continued)

FOREIGN PATENT DOCUMENTS

| | | | |
|---|---|---|---|
| CN | 1885096 A | 12/2006 | |
| CN | 101196615 A | 6/2008 | |

(Continued)

OTHER PUBLICATIONS

U.S. Appl. No. 12/821,221, filed Jun. 23, 2010.

(Continued)

*Primary Examiner* — Loan L. T. Truong
(74) *Attorney, Agent, or Firm* — Cantor Colburn LLP; Steven Chiu (57) ABSTRACT

A system and computer implemented method for isolating errors in a computer system is provided. The method includes receiving a direct memory access (DMA) command to access a computer memory, a read response, or an interrupt; associating the DMA command to access the computer memory, the read response, or the interrupt with a stream identified by a stream identification (ID); detecting a memory error caused by the DMA command in the stream, the memory error resulting in stale data in the computer memory; and isolating the memory error in the stream associated with the stream ID from other streams associated with other stream IDs upon detecting the memory error.

25 Claims, 4 Drawing Sheets

(56) References Cited

U.S. PATENT DOCUMENTS

| | | | |
|---|---|---|---|
| 5,742,785 A | 4/1998 | Stone et al. | |
| 5,761,448 A | 6/1998 | Adamson et al. | |
| 5,790,825 A | 8/1998 | Traut | |
| 5,815,647 A * | 9/1998 | Buckland et al. | 714/3 |
| 5,838,960 A | 11/1998 | Harriman, Jr. | |
| 5,870,598 A | 2/1999 | White et al. | |
| 5,949,646 A | 9/1999 | Lee et al. | |
| 5,960,213 A | 9/1999 | Wilson | |
| 5,963,425 A | 10/1999 | Chrysler et al. | |
| 6,009,261 A | 12/1999 | Scalzi et al. | |
| 6,023,736 A | 2/2000 | Lambeth et al. | |
| 6,067,595 A | 5/2000 | Lindenstruth | |
| 6,112,311 A | 8/2000 | Beardsley et al. | |
| 6,205,530 B1 | 3/2001 | Kang | |
| 6,301,133 B1 | 10/2001 | Cuadra et al. | |
| 6,308,255 B1 | 10/2001 | Gorishek, IV et al. | |
| 6,330,656 B1 | 12/2001 | Bealkowski et al. | |
| 6,341,064 B1 | 1/2002 | Bradley | |
| 6,349,380 B1 | 2/2002 | Shahidzadeh et al. | |
| 6,362,942 B2 | 3/2002 | Drapkin et al. | |
| 6,408,347 B1 | 6/2002 | Smith et al. | |
| 6,456,498 B1 | 9/2002 | Larson et al. | |
| 6,523,140 B1 | 2/2003 | Arndt et al. | |
| 6,538,881 B1 | 3/2003 | Jeakins et al. | |
| 6,544,311 B1 | 4/2003 | Walton et al. | |
| 6,594,148 B1 | 7/2003 | Nguyen et al. | |
| 6,595,018 B2 | 7/2003 | Goth et al. | |
| 6,625,169 B1 | 9/2003 | Tofano | |
| 6,625,648 B1 | 9/2003 | Schwaller et al. | |
| 6,643,727 B1 | 11/2003 | Arndt et al. | |
| 6,658,599 B1 | 12/2003 | Linam et al. | |
| 6,721,813 B2 | 4/2004 | Owen et al. | |
| 6,816,590 B2 | 11/2004 | Pike et al. | |
| 6,845,428 B1 | 1/2005 | Kedem | |
| 6,845,469 B2 | 1/2005 | Hicks et al. | |
| 6,927,975 B2 | 8/2005 | Crippen et al. | |
| 6,950,438 B1 | 9/2005 | Owen et al. | |
| 6,973,510 B2 | 12/2005 | Arndt et al. | |
| 7,003,615 B2 | 2/2006 | Chui et al. | |
| 7,004,233 B2 | 2/2006 | Hasegawa et al. | |
| 7,007,099 B1 | 2/2006 | Donati et al. | |
| 7,032,052 B2 | 4/2006 | Sauber et al. | |
| 7,042,734 B2 | 5/2006 | Hensley et al. | |
| 7,053,502 B2 | 5/2006 | Aihara et al. | |
| 7,062,594 B1 | 6/2006 | Sardella et al. | |
| 7,075,788 B2 | 7/2006 | Larson et al. | |
| 7,093,155 B2 | 8/2006 | Aoki | |
| 7,096,308 B2 | 8/2006 | Main et al. | |
| 7,103,808 B2 * | 9/2006 | Kitamorn et al. | 714/44 |
| 7,107,331 B2 | 9/2006 | Gava et al. | |
| 7,107,495 B2 | 9/2006 | Kitamorn et al. | |
| 7,134,040 B2 | 11/2006 | Ayres | |
| 7,152,136 B1 | 12/2006 | Charagulla | |
| 7,163,546 B2 | 1/2007 | Mirizzi et al. | |
| 7,206,946 B2 | 4/2007 | Sakakibara et al. | |
| 7,219,181 B2 | 5/2007 | Carty | |
| 7,260,620 B1 | 8/2007 | Halasz | |
| 7,313,643 B2 | 12/2007 | Sakurai et al. | |
| 7,370,224 B1 | 5/2008 | Jaswa et al. | |
| 7,447,934 B2 * | 11/2008 | Dasari et al. | 714/5.11 |
| 7,457,900 B2 | 11/2008 | Panesar | |
| 7,464,174 B1 | 12/2008 | Ngai | |
| 7,478,167 B2 | 1/2009 | Ould-Brahim et al. | |
| 7,480,303 B1 | 1/2009 | Ngai | |
| 7,519,647 B2 | 4/2009 | Carlough et al. | |
| 7,525,957 B2 | 4/2009 | Scherer et al. | |
| 7,535,828 B2 | 5/2009 | Raszuk et al. | |
| 7,546,386 B2 | 6/2009 | Arndt et al. | |
| 7,558,348 B1 | 7/2009 | Liu et al. | |
| 7,565,463 B2 | 7/2009 | Johnsen et al. | |
| 7,594,144 B2 | 9/2009 | Brandyberry et al. | |
| 7,613,847 B2 | 11/2009 | Kjos et al. | |
| 7,617,340 B2 | 11/2009 | Gregg | |
| 7,617,345 B2 | 11/2009 | Clark et al. | |
| 7,624,235 B2 | 11/2009 | Wadhawan et al. | |
| 7,627,723 B1 | 12/2009 | Buck et al. | |
| 7,631,097 B2 | 12/2009 | Moch et al. | |
| 7,660,912 B2 | 2/2010 | Gregg | |
| 7,664,991 B1 * | 2/2010 | Gunda et al. | 714/43 |
| 7,676,617 B2 | 3/2010 | Kloeppner | |
| 7,729,316 B2 | 6/2010 | Uhlik | |
| 7,836,254 B2 | 11/2010 | Gregg et al. | |
| 7,873,851 B1 | 1/2011 | Linnell et al. | |
| 7,975,076 B2 | 7/2011 | Moriki et al. | |
| 8,032,684 B2 | 10/2011 | Pettey et al. | |
| 8,041,811 B2 | 10/2011 | Calippe et al. | |
| 8,046,627 B2 | 10/2011 | Takubo | |
| 8,082,466 B2 | 12/2011 | Tanaka et al. | |
| 8,140,917 B2 * | 3/2012 | Suetsugu et al. | 714/50 |
| 8,510,592 B1 * | 8/2013 | Chan | 714/5.1 |
| 2002/0112067 A1 | 8/2002 | Chang et al. | |
| 2003/0056155 A1 | 3/2003 | Austen et al. | |
| 2003/0058618 A1 | 3/2003 | Soetemans et al. | |
| 2003/0097503 A1 | 5/2003 | Huckins | |
| 2003/0177221 A1 | 9/2003 | Ould-Brahim et al. | |
| 2003/0198180 A1 | 10/2003 | Cambron | |
| 2003/0200477 A1 | 10/2003 | Ayres | |
| 2004/0024905 A1 | 2/2004 | Liao et al. | |
| 2004/0088604 A1 | 5/2004 | Bland et al. | |
| 2004/0117534 A1 | 6/2004 | Parry et al. | |
| 2004/0130868 A1 | 7/2004 | Schwartz et al. | |
| 2004/0133819 A1 | 7/2004 | Krishnamurthy et al. | |
| 2004/0136130 A1 | 7/2004 | Wimmer et al. | |
| 2004/0199700 A1 | 10/2004 | Clayton | |
| 2005/0024187 A1 | 2/2005 | Kranz et al. | |
| 2005/0033895 A1 | 2/2005 | Lueck et al. | |
| 2005/0071472 A1 | 3/2005 | Arndt et al. | |
| 2005/0091438 A1 | 4/2005 | Chatterjee | |
| 2005/0116546 A1 | 6/2005 | Zeighami et al. | |
| 2005/0144533 A1 | 6/2005 | LeVangia et al. | |
| 2005/0146855 A1 | 7/2005 | Brehm et al. | |
| 2005/0160214 A1 | 7/2005 | Sauber et al. | |
| 2005/0162830 A1 | 7/2005 | Wortman et al. | |
| 2005/0182862 A1 | 8/2005 | Ritz et al. | |
| 2005/0213513 A1 | 9/2005 | Ngo et al. | |
| 2005/0276017 A1 | 12/2005 | Aziz et al. | |
| 2005/0286187 A1 | 12/2005 | Liu et al. | |
| 2005/0289271 A1 | 12/2005 | Martinez et al. | |
| 2005/0289278 A1 | 12/2005 | Tan et al. | |
| 2006/0053339 A1 * | 3/2006 | Miller et al. | 714/15 |
| 2006/0067069 A1 | 3/2006 | Heard et al. | |
| 2006/0085150 A1 | 4/2006 | Gorin | |
| 2006/0085573 A1 | 4/2006 | Pike et al. | |
| 2006/0087813 A1 | 4/2006 | Becker et al. | |
| 2006/0087814 A1 | 4/2006 | Brandon et al. | |
| 2006/0095607 A1 | 5/2006 | Lim et al. | |
| 2006/0195644 A1 | 8/2006 | Arndt et al. | |
| 2006/0206639 A1 | 9/2006 | Tee et al. | |
| 2006/0230208 A1 | 10/2006 | Gregg et al. | |
| 2006/0236054 A1 | 10/2006 | Kitamura | |
| 2006/0237636 A1 | 10/2006 | Lyons et al. | |
| 2006/0253619 A1 | 11/2006 | Torudbakken et al. | |
| 2006/0288130 A1 | 12/2006 | Madukkarumukumana et al. | |
| 2006/0291447 A1 | 12/2006 | Siliquini et al. | |
| 2007/0008663 A1 | 1/2007 | Nakashima et al. | |
| 2007/0069585 A1 | 3/2007 | Bosco et al. | |
| 2007/0073955 A1 | 3/2007 | Murray et al. | |
| 2007/0078996 A1 | 4/2007 | Chen et al. | |
| 2007/0115230 A1 | 5/2007 | Tajiri et al. | |
| 2007/0136554 A1 | 6/2007 | Biran et al. | |
| 2007/0168636 A1 | 7/2007 | Hummel et al. | |
| 2007/0183393 A1 | 8/2007 | Body et al. | |
| 2007/0186074 A1 | 8/2007 | Bradford et al. | |
| 2007/0211430 A1 | 9/2007 | Bechtolsheim | |
| 2007/0226386 A1 | 9/2007 | Sharp et al. | |
| 2007/0226523 A1 | 9/2007 | Chang | |
| 2007/0234018 A1 | 10/2007 | Feiste | |
| 2007/0239925 A1 | 10/2007 | Koishi | |
| 2007/0245041 A1 | 10/2007 | Hua et al. | |
| 2007/0262891 A1 * | 11/2007 | Woodral et al. | 341/51 |
| 2007/0271559 A1 | 11/2007 | Easton et al. | |
| 2007/0273018 A1 | 11/2007 | Onozuka et al. | |
| 2007/0274039 A1 | 11/2007 | Hamlin | |
| 2008/0043405 A1 | 2/2008 | Lee et al. | |

(56) References Cited

U.S. PATENT DOCUMENTS

| | | |
|---|---|---|
| 2008/0065796 A1 | 3/2008 | Lee et al. |
| 2008/0069141 A1* | 3/2008 | Bonaguro et al. ............ 370/469 |
| 2008/0077817 A1 | 3/2008 | Brundridge |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0147943 A1 | 6/2008 | Freimuth et al. |
| 2008/0148295 A1 | 6/2008 | Freimuth et al. |
| 2008/0162865 A1 | 7/2008 | Koufaty et al. |
| 2008/0168208 A1 | 7/2008 | Gregg |
| 2008/0189577 A1 | 8/2008 | Arndt et al. |
| 2008/0192431 A1 | 8/2008 | Bechtolsheim |
| 2008/0209114 A1 | 8/2008 | Chow et al. |
| 2008/0222406 A1 | 9/2008 | Tabuchi |
| 2008/0235425 A1 | 9/2008 | Belmar et al. |
| 2008/0239687 A1 | 10/2008 | Leigh et al. |
| 2008/0239945 A1 | 10/2008 | Gregg |
| 2008/0259555 A1 | 10/2008 | Bechtolsheim et al. |
| 2008/0263246 A1 | 10/2008 | Larson et al. |
| 2008/0270853 A1 | 10/2008 | Chagoly et al. |
| 2008/0288661 A1 | 11/2008 | Galles |
| 2009/0037682 A1 | 2/2009 | Armstrong et al. |
| 2009/0070760 A1 | 3/2009 | Khatri et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0182966 A1 | 7/2009 | Greiner et al. |
| 2009/0182969 A1 | 7/2009 | Norgaard et al. |
| 2009/0210527 A1 | 8/2009 | Kawato |
| 2009/0210646 A1 | 8/2009 | Bauman et al. |
| 2009/0222814 A1 | 9/2009 | Astrand |
| 2009/0234987 A1 | 9/2009 | Lee et al. |
| 2009/0240849 A1 | 9/2009 | Corneli et al. |
| 2009/0249039 A1 | 10/2009 | Hook et al. |
| 2009/0276551 A1 | 11/2009 | Brown et al. |
| 2009/0276773 A1 | 11/2009 | Brown et al. |
| 2009/0276774 A1 | 11/2009 | Kinoshita |
| 2009/0328035 A1 | 12/2009 | Ganguly |
| 2010/0005234 A1 | 1/2010 | Ganga et al. |
| 2010/0005531 A1* | 1/2010 | Largman et al. ................ 726/24 |
| 2010/0027559 A1 | 2/2010 | Lin et al. |
| 2010/0042999 A1* | 2/2010 | Dorai et al. .................... 718/101 |
| 2010/0077117 A1 | 3/2010 | Asnaashari |
| 2010/0115329 A1 | 5/2010 | Tanaka et al. |
| 2010/0131359 A1 | 5/2010 | Ting et al. |
| 2010/0146089 A1 | 6/2010 | Freimuth et al. |
| 2010/0157463 A1 | 6/2010 | Arizono et al. |
| 2010/0169674 A1 | 7/2010 | Kazama |
| 2010/0205608 A1* | 8/2010 | Nemirovsky et al. ......... 718/104 |
| 2010/0211714 A1 | 8/2010 | LePage |
| 2010/0287209 A1* | 11/2010 | Hauser ......................... 707/803 |
| 2010/0312894 A1 | 12/2010 | Awad et al. |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0317351 A1 | 12/2011 | Pizzolato et al. |
| 2011/0317743 A1 | 12/2011 | DeCusatis et al. |
| 2011/0320602 A1 | 12/2011 | Carlson et al. |
| 2011/0320653 A1 | 12/2011 | Lais et al. |
| 2011/0320666 A1 | 12/2011 | Gregg et al. |
| 2011/0320670 A1 | 12/2011 | Bayer et al. |
| 2011/0320674 A1 | 12/2011 | Gregg et al. |
| 2011/0320675 A1 | 12/2011 | Gregg et al. |
| 2011/0320703 A1 | 12/2011 | Craddock et al. |
| 2011/0320796 A1 | 12/2011 | DeCusatis et al. |
| 2011/0320861 A1 | 12/2011 | Bayer et al. |
| 2011/0320887 A1 | 12/2011 | Craddock et al. |

FOREIGN PATENT DOCUMENTS

| | | |
|---|---|---|
| CN | 101571631 A | 11/2009 |
| CN | 102193239 A | 9/2011 |
| JP | 57191826 | 11/1982 |
| JP | 5981724 | 5/1984 |
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |
| WO | WO9600940 | 11/1996 |
| WO | 2009027189 A1 | 3/2008 |

OTHER PUBLICATIONS

U.S. Appl. No. 12/821,222, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12,821,245, filed Jun. 23, 2010.
U.S. Appl. No. 12/821,247, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,256, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages. 892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pp. -10; Downloaded: Apr. 13,2010 at 18:53:46 UTC from IEEE Xplore. 1-4244-0328-6/06.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support for Multiple Page Sizes" 1998; pp. 1-9.
U.S. Appl. No. 12/821,221, Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Micael M. et al., "Improving the Reliability of Commodity Operating Systems," ACM Transactions on Computer Systems, vol. 23, No. 1, Feb. 2005, pp. 77-110.
Talluri et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1-5; http://wiki.xensource.com/xenwiki/VTdHowTo.

(56) References Cited

OTHER PUBLICATIONS

Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/Architecture Principles of Operation, Feb. 2009; pp. 1-1344.
z/VM: Running Guest Operating Systems, IBM Publication No. SC24-5997-02, Oct. 2001.
International Search Report for PCT/EP2011/059810, Sep. 14, 2011.
Final Office Action Received Mar. 2, 2012 for U.S. Appl. No. 12/821,221.
U.S. Appl. No. 12/821,245; Non Final Office Action dated—Mar. 1, 2012.
PCI Express Base Specification Rev 1.0a, Apr. 15, 2003 p. 1-2, 31, 35-36, 43-44, 49-51, 55, 59-62, 74, 101.
Non Final Office Action Received Feb. 16, 2012 for U.S. Appl. No. 12/821,250.
Non Final Office Action received May 4, 2012 for U.S. Appl. No. 12/821,256.
Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.
J. Regula, "Using Non-transparent Bridging in PCI Express Systems", PLX Technology, Inc., pp. 1-31, Jun. 1, 2004.
Jack Regula "Ethernet Tunneling through PCI Express Inter-Processor Communication, Low Latency Storage IO Source"; www.wwpi.com; Publisher: Computer Technology Review, Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
Non Final Office Action received Mar. 15, 2012 for U.S. Appl. No. 12/821,242.
Non Final Office Action dated Apr. 3, 2012 for U.S. Appl. No. 12/821,226.
Non Final Office Action recieved May 8, 2012 for U.S. Appl. No. 12/821,243.
Non Final Office Action for U.S. Appl. No. 12/821,224 dated May 15, 2012.
Non-final Office Action dated Jun. 5, 2012 for U.S. Appl. No. 12/821,221.
Notice of Allowance recieved Jun. 1, 2012 for U.S. Appl. No. 12/821,248.
Restriction Requirement received Jun. 18, 2012 for U.S. Appl. No. 12/821,239.
Final Office Action mail date Jun. 15, 2011 for U.S. Appl. No. 12/821,221.
Non-final office Action received for U.S. Appl. No. 12/821,239 dated Nov. 8, 2012.
Final Office Action dated Aug. 30, 2012 for U.S. Appl. No. 12/821,245.
Non-final Office Action dated Sep. 26, 2012 for U.S. Appl. No. 12/821,243.
Final Office Action dated Sep. 13, 2012 for U.S. Appl. No. 12/821,256.
Final Office Action received Oct. 10, 2012 for U.S. Appl. No. 12/821,221.
Notice of Allowance dated Sep. 19, 2012 for U.S. Appl. No. 12/821,224.
Final Office Action dated Jul. 19, 2012 for U.S. Appl. No. 12/821,250.
Non-final Office Action received Oct. 11, 2012 for U.S. Appl. No. 12/821,247.
Final Office Action dated Jun. 14, 2013 for U.S. Appl. No. 12/821,239.
Informational Materials for IDS, Docket No. POU920110028PCT1, date May 8, 2013, 4 pages.
International Search Report of the Patent Cooperation Treaty for International Application No. PCT/CN2013/070828, mailing date Apr. 24, 2013, 13 pages.

\* cited by examiner

FIG. 1

| REQUESTER/ COMPLETER ID | STREAM ID |
|---|---|
| 1 | 2 |
| 2 | 2 |
| 3 | 3 |
| 4 | 3 |
| 5 | 5 |

| STREAM ID | LOCK ENABLED | LOCKED |
|---|---|---|
| 1 | YES | NO |
| 2 | NO | n.a. |
| 3 | YES | LOCKED |
| 4 | YES | NO |
| 5 | NO | n.a. |

MEMORY ERROR ISOLATION AND RECOVERY IN A MULTIPROCESSOR COMPUTER SYSTEM

BACKGROUND

This invention relates generally to processing within a computing environment, and more particularly to memory error isolation and recovery in a multi-processor computer system.

In a computing system within a Peripheral Component Interconnect Express (PCIe) environment, ordering rules ensure a uniformity to provide memory consistency. For example, when an input/output (I/O) adapter writes into system memory, using PCIe defined Posted Memory Write Requests, the updates in memory appear in order to the system software or device driver. In a typical I/O operation, an adapter writes a block of data followed by status into system memory. This operation usually requires several Posted Memory Write Requests and these requests must appear to the system software to be written in strict order in system memory. Therefore, if the system software polls the status waiting for a completion, it knows that any associated data previously written in system memory is valid. Interrupts from I/O adapters are called MSIs (Message Signaled Interrupts) and appear as Posted Memory Write Requests on the PCI interface. Because interrupts are Posted Memory Write Requests, they are also ordered with respect to other Posted Memory Write Requests and the other ordering rules described below. When the program receives an interrupt from an I/O adapter, it knows that all data and status information has been written in to memory and is valid.

Another ordering rule guarantees that when an adapter writes data into system memory and then fetches data from the same system memory address, it observes the new data just written. Still another ordering rule guarantees that when software reads data, perhaps just a single register in an adapter, when the read response is received by the software it knows that any previous Posted Memory Write data is visible in system memory. This rule is useful in synchronizing operation between the adapter and software.

However, errors may occur as data is written into system memory. In many computer systems, these errors either stop the entire computer or they leave an indication or footprint that the data is corrupted. This indication is often accomplished by storing data with a bad ECC (error correcting code) into system memory, which is often referred to as a 'special uncorrectable error" (special UE). As a result, even if software views a good status, when it reads the data, it will see a special UE and know that the data is corrupted and can perform the appropriate recovery. If the data were not marked, the software would observe good data even though it was corrupted, which results in data integrity problems.

In some computer systems, including System z® servers offered by International Business Machines Corporation, certain errors in the memory subsystem will not mark the data as bad and will not update the memory at all. One example is a partial memory write with an uncorrectable error in a cache. In this case, the data in the cache remains in error; however, the copy in memory is not changed and therefore, contains stale data. Another example is an uncorrectable error in the storage key, reference, and change information for the corresponding data in system memory. As in the partial write case, the data in memory is not changed and therefore, contains stale data.

BRIEF SUMMARY

An exemplary embodiment is a computer-implemented method for isolating errors in a computer system. The method includes receiving a direct memory access (DMA) command to access a computer memory, a read response, or an interrupt; associating the DMA command, read response, or interrupt with a stream identified by a stream identification (ID); detecting a memory error caused by the DMA command in the stream resulting in stale data in the computer memory; and isolating the memory error in the stream associated with the stream ID from other streams associated with other stream IDs upon detecting the memory error.

In an exemplary embodiment is a system for isolating errors in a computer system. The system includes a computer memory; and one or more controllers in communication with the computer memory, the one or more controllers configured to perform a method comprising: receiving a direct memory access (DMA) command, to access a computer memory, a read response, or an interrupt; associating the DMA command, read response, or interrupt with a stream identified by a stream identification (ID); detecting a memory error caused by the DMA command in the stream resulting in stale data in the computer memory; and isolating the memory error in the stream associated with the stream ID from other streams associated with other stream IDs upon detecting the memory error.

In yet another exemplary embodiment is a computer program product for dispatching a task in a computer system. The computer program product includes a tangible storage medium readable by a processing circuit and storing instructions for execution by the processing circuit for performing a method comprising: receiving a direct memory access (DMA) command to access a computer memory, a read response, or an interrupt; associating the DMA command with a stream identified by a stream identification (ID); detecting a memory error caused by the DMA command in the DMA stream resulting in stale data in the computer memory; and isolating the memory error in the stream associated with the stream ID from other streams associated with other stream IDs upon detecting the memory error.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Referring now to the drawings herein wherein like elements are numbered alike in the several FIGS..

DETAILED DESCRIPTION

Exemplary embodiments of the present invention provide a system and a method for isolating memory errors caused by one or more direct memory access (DMA) write transaction or command (e.g., system memory write request) associated with a memory stream. In an exemplary embodiment, memory errors are isolated to one or more requesting adapters or one or more functions of an adapter. In an exemplary embodiment, the system is used to recover I/O adapters accessing system memory by one or more DMA write commands causing system memory errors (e.g., uncorrectable errors) that result in stale data in memory. The system may enable other adapters to continue to operate as the failing adapters are being recovered according to an exemplary embodiment. This is accomplished by dividing commands into multiple ordered streams each identified by a stream ID with a 'lock enable' bit and a 'locked' bit according to an exemplary embodiment. This eliminates the data integrity exposures in a peripheral component interconnect express (PCIe) environment in which the system is implemented in according to an exemplary embodiment.

Exemplary embodiments of the present invention isolate errors to one or more adapters. As such, the system prevents subsequent memory commands (read or write requests), read responses, and interrupts from one or more adapters associated with a memory stream with a command causing an error resulting in stale data. However, the system can further provide isolation in a more fine-grained manner, such as, for example isolation to one function of an adapter from other functions of the adapter. For ease of discussion, exemplary embodiments of the error isolation and recovery systems and methods will be described in the context to one or more adapters associated with one or more streams.

Current large computer systems having multiple I/O adapters apply strict ordering rules to each individual adapter. However, no order rules exist among the adapters. In other words, if two adapters each send a write request to system memory, even though the first adapter sent a request before the second adapter, it is acceptable for the request from the second adapter to be visible in system memory to software before the request from the first adapter is visible in system memory. However, when either adapter sends multiple write requests, these requests must be kept in order with respect to each other and executed in order. The commands described herein can each be any one of a write or a read-modify-write command/request.

When accessing system memory, strict ordering requires a level of serialization that prevents the memory subsystem to operate at full bandwidth. Exemplary embodiments of the present invention classify I/O traffic (requests) into multiple independent ordered streams, thereby enabling the memory subsystem to relax strict ordering between different streams with DMA commands to achieve higher bandwidth. For example, in the memory subsystem using multiple independent memory blocks, multiple write requests in different ordered streams may be simultaneously sent to each block without regard to the order the memory writes are visible to the software. This parallelism maximizes memory subsystem bandwidth.

According to an exemplary embodiment, multiple memory write request streams are identified by a parameter in the request called a 'stream ID'. Each adapter may be assigned to one value of a stream ID. Alternatively, multiple adapters may share the same stream ID.

In an exemplary embodiment, after stale data caused by an adapter is detected in the system memory, not only are subsequent writes into system memory prevented from the error causing adapter, but completions to memory read requests originated by a processor are prevented. Interrupts from the error causing adapter may also be prevented.

Figure 1:
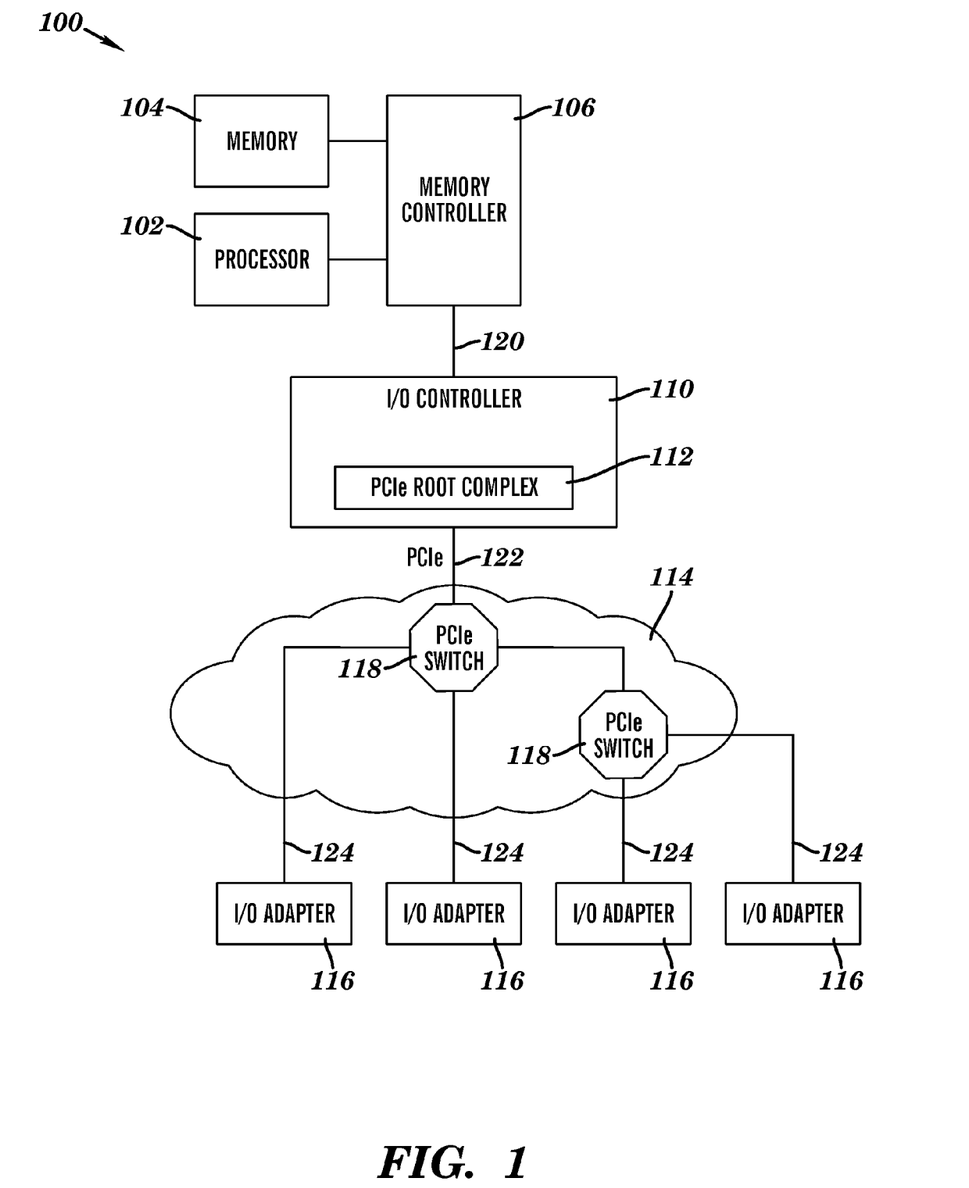
FIG. 1 depicts a block diagram of a computing system that may be implemented by an exemplary embodiment.

Turning now to FIG. 1, a block diagram of a computing system 100 in which exemplary embodiments of the present invention may be implemented. In an exemplary embodiment, the system 100 includes an error isolation and recovery system in accordance with the present disclosure. In an exemplary embodiment, the system 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety.

In an exemplary embodiment, system 100 includes one or more processors 102 coupled to a system memory 104 (main memory/computer memory) via a memory controller 106. To access system memory 104, a processor 102 issues a read, write or modify request that includes an address used to access system memory 104. When the system 100 is in operation, the processor 102 is configured to execute instructions stored within system memory 104, to communicate data to and from the system memory 104, and generally to control operations of the system 100 pursuant to the instructions. The processor 102 can be any custom made or commercially available processor, a central processing unit (CPU), an auxiliary processor among several processors associated with the computer system, a semiconductor based micro-processor (the form of a microchip or chip set), a macro-processors, or generally any device for executing instructions. In an exemplary embodiment, the processor comprises a combination of hardware and/or software/firmware with a computer program that, when loaded and executed, permits the processor 102 to operate such that it carries out the methods described herein. Although only one processor 102 is depicted, the system 100 may include additional processors. The processor 102 along with memory controller 106, and an I/O controller include the error isolation and recovery systems and methods as described herein.

The system 100 may comprise an I/O controller 110 with a root complex 112, which may be PCIe defined according to an exemplary embodiment. The system may also comprise switching fabric 114 to route packetized communications between the root complex 112 and I/O adapters or peripheral devices 116. Switching fabric 114 may include a plurality of switching devices 118 to provide switching functionality. Communication path 120 couple the memory controller with the I/O controller 110, communication path 122 couple root complex 112 with switching devices 118, while communication paths 124 couple switching devices 118 with I/O adapters 116. Although only two switching devices are illustrated in FIG. 1, the system may include any number of switching devices, which may be PCIe defined according to an exemplary embodiment. The communication path 122 can be a PCIe defined interface that allows one or more than one I/O adapter 116 to communicate with the I/O controller 110 via PCIe switches 118. This allows certain classes of errors that are caused by one adapter to not affect the other devices sharing the same PCIe interface. The types of errors being isolated in the exemplary embodiments are ones that leave the system memory 104 in an unmodified state or ones that leave stale data into memory 104. These types of errors may lead to data integrity issues.

Figure 2:
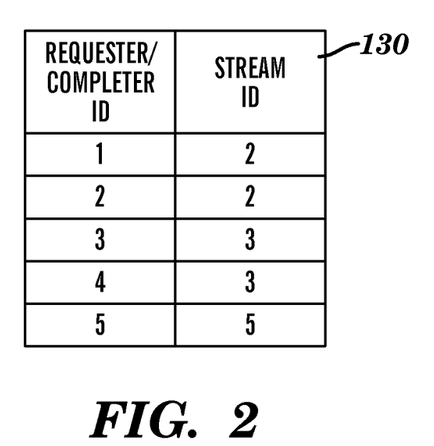
FIG. 2 depicts a first table of each adapter associated with a stream ID that may be implanted by an exemplary embodiment.
Figure 3:
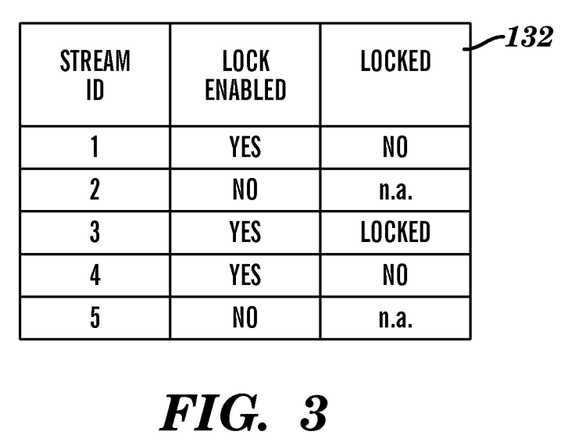
FIG. 3 depicts a second table of the state of each stream ID that may be implemented by an exemplary embodiment.

In an exemplary embodiment, the I/O controller 110 associates each adapter 116 with a memory stream. Thus, the DMA commands from each adapter are associated with a unique memory stream. Specifically, commands or requests, which may include DMA memory write requests, read responses, and interrupts from the I/O adapters 116 are each associated with a memory stream identified by a stream ID, which is an artificial flow control concept according to an exemplary embodiment. Of course, one or more functions within an adapter 116 can each be associated with a unique stream to achieve isolation in a more fine-grained manner. This association is performed by the I/O controller 110 through its layers of translation and protection (ATP), where an adapter ID in DMA Requests and MSIs and completer IDs in read responses associated with an I/O adapter is associated with a stream ID as depicted in a table 130 in FIG. 2. For example, requester/completer ID #1 is associated with stream ID #2, requester/completer ID #2 is associated with stream ID #2, requester/completer ID #3 is associated with stream ID #3, etc. As shown, more than one adapter can be associated with a single stream ID. The I/O controller 110 uses the requester/completer ID from PCIe through one or more switching devices 118 to distinguish which adapter on the other side of the switching device is making the request or completion (response). The stream ID associated with each adapter 116 is sent to the memory controller 106 by the I/O controller 110 via communication path 120. As such, the stream ID information and the associated adapter are known by both controllers (106, 110). In particular, the memory controller 106 includes a table 132 to keep track of the status of each stream ID as depicted in FIG. 3.

The DMA commands (memory write requests) are sent to the memory controller 106 along with each of their associated stream IDs from the I/O controller 110. Each stream ID includes a first bit or a 'lock-enable' bit that allows the stream to be placed into a locked state upon detecting a system memory error (e.g., uncorrectable error) resulting in stale data in system memory 104. In other words, the lock-enable bit is selectively set to indicate whether the stream ID can be placed in a locked state. Each stream ID further includes a second bit or a 'locked' bit that is set when a system memory error is detected.

The lock-enable bit is useful in systems that return explicit status information for each memory write request. As previously mentioned, PCI has 'posted' memory write requests, and no status (good or bad) is returned to the adapter. As such, in systems that provide status, strict ordering may be relaxed, and the adapter waits at certain points in the process for good status responses before proceeding to the next command.

In an exemplary embodiment, the memory controller 106 keeps track of every DMA command associated with each stream ID from the I/O controller 110. The memory controller 106 achieves parallelism by allowing many DMA write commands associated with different stream IDs to be performed in parallel. The memory controller 106 also maintains strict ordering of every DMA write command associated with each stream ID assigned by the I/O controller 110. For example, all write requests in one stream associated with one adapter are completed in order with respect to that stream and adapter. However, no ordering is maintained between the stream of one adapter and other streams of different adapters, which increases bandwidth. Therefore, using the stream ID concept will enable the memory controller 106 to maintain order of all write commands associated with a particular stream ID with respect to one another while ordering other commands associated with other stream IDs asynchronously with respect to other stream IDs.

In accordance with an exemplary embodiment, the memory controller 106 detects system memory write errors caused by one or more adapters 116 associated with a particular stream ID. In accordance with an exemplary embodiment, memory access in itself does not 'cause' the error. Instead, the error is in the memory and this error is detected when one or more adapters 116 attempt to access the data according to an exemplary embodiment. Upon detection, the memory controller 106 sets the second bit of the stream ID to a locked state and blocks all subsequent requests, read responses, and interrupts having the same stream ID by checking the status of each stream ID received by the memory controller 106. In other words, the memory controller 106 does not process any commands associated with the stream ID in the locked state. As such, the memory error is isolated to just the error causing adapter(s). Of course, errors can be isolated to a function within an adapter that experienced the error. In accordance with an exemplary embodiment, the memory controller 106 further prevents any memory read completions to memory read requests originated by the processor 102 once the particular stream ID associated with such a request is locked. Interrupts from the adapter are also blocked.

Figure 4:
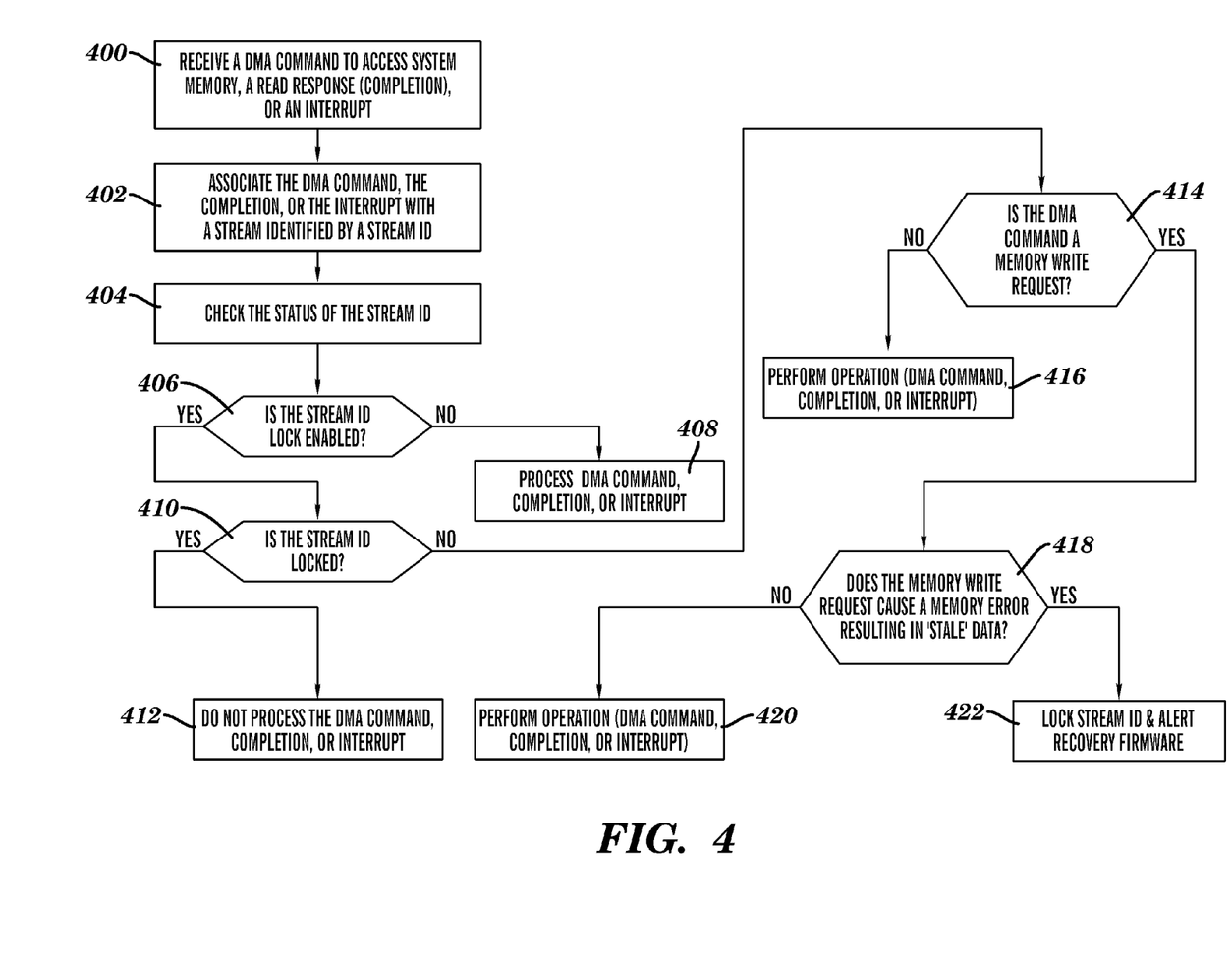
FIG. 4 depicts a flow diagram illustrating a method of error isolation and recovery that may be implemented by an exemplary embodiment.

FIG. 4 illustrates a process flow diagram of an error isolation and recovery method according to an exemplary embodiment of the present invention. At block 400, receive a DMA command to access system memory, a read response (completion), or an interrupt. The DMA command can be a DMA read or write request according to an exemplary embodiment. In an exemplary embodiment, the I/O controller 110 receives the DMA command, the read response, or the interrupt from the adapters 116. At 402, associate the DMA command to access the system memory, the read response, or the interrupt with a stream identified by a stream ID. In an exemplary embodiment, the I/O controller 110 associates the DMA command, read response, or interrupt with a stream ID. At 404, check the status of the stream ID. In an exemplary embodiment, the memory controller 106 checks the status. At block 406, determine whether the stream ID is lock enabled. In an exemplary embodiment, the memory controller 106 determines whether the stream ID is lock enabled. If the answer to block 406 is no, then process the DMA command, completion or interrupt at block 408. If the answer to block 406 is yes, then determine whether the stream ID is locked at block 410. If the answer to block 410 is yes, then do not process the DMA request, completion, or interrupt at block 412. In an exemplary embodiment, a locked response is returned to the I/O controller 110 if the DMA command is a DMA write request or interrupt. If the answer to block 410 is no, then determine if the DMA command is a memory write request at block 414. If the answer to block 412 is no, then perform operation at block 416. The operation may be a read request, completion or interrupt. If the answer to block 414 is yes, then determine if the memory write request caused a memory error resulting in stale data at block 418. According to an exemplary embodiment, the memory controller 106 detects whether the memory write request caused a memory error resulting in stale data in memory. If the answer to block 418 is no, then perform operation at block 420. The operation may be a request, completion, or interrupt. If the answer to block 418 is yes, then lock the stream ID and alert recovery firmware at block 422. The stream ID is locked by setting the second bit of the stream ID to a locked state at the memory controller 106 according to an exemplary embodiment. In doing so, any error causing adapters associated with the stream ID are recovered by placing the adapter to a known state while allowing other adapters associated with other streams IDs to continue operation. As part of the recovery procedure, the memory address for the failed DMA write request is captured by the I/O controller 110 and used by the recovery firmware to isolate the error. In an exemplary embodiment, an error response is returned to the I/O controller 110. Each block described above can individually be performed or executed by processor 102, memory controller 106, I/O controller 110 or a combination thereof and should not be limited to any one embodiment or example described herein.

As used herein, the term "controller" refers to an application specific integration circuit (ASIC), an electronic circuit, a processor (shared, dedicated, or group) and memory that executes one or more software or firmware programs, a combinational logic circuit, and/or other suitable components that provide the described functionality.

The methods described herein can be performed or executed by any single processor, controller or a combination thereof or by multiple numbers of processors, controllers or a combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "controller" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
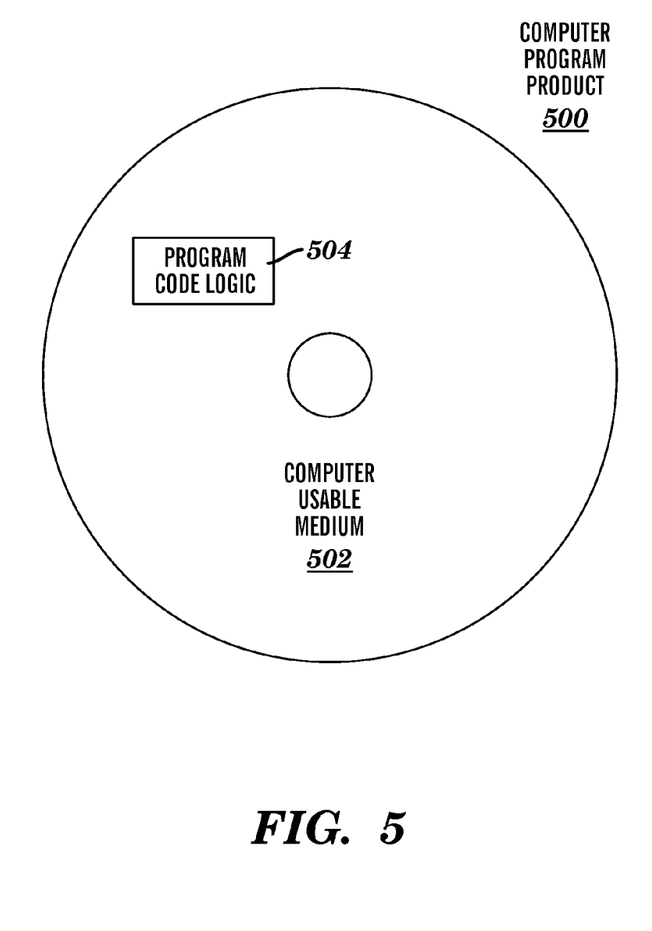
FIG. 5 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A computer implemented method for isolating errors in a computer system, the method comprising:
    receiving a direct memory access (DMA) command to access a computer memory, a read response, or an interrupt;
    associating the DMA command to access the computer memory, the read response or the interrupt with a stream identified by a stream identification (ID);
        detecting a memory error caused by the DMA command in the stream, the memory error resulting in stale data in the computer memory; and
    isolating the memory error in the stream associated with the stream ID from other streams associated with other stream IDs upon detecting the memory error.

2. The method of claim 1, wherein the stream ID includes a first bit indicating whether the stream is lock enabled and a second bit indicating whether the stream is in a locked state.

3. The method of claim 2, further comprising isolating the memory error in the stream associated with the stream ID from other streams associated with other stream IDs by setting the second bit in the stream ID to a locked state.

4. The method of claim 3, further comprising setting the first bit to a lock enable state enabling the second bit to be set to the locked state.

5. The method of claim 3, further comprising blocking subsequent DMA commands to access the computer memory, read responses, and interrupts associated with the stream ID in the locked state.

6. The method of claim 3, further comprising performing a recovery process on at least one requesting adapter having an adapter ID associated with the stream ID in the locked state while enabling other requesting adapters having other adapter IDs associated with other streams IDs to continue operation.

7. The method of claim 1, further comprising maintaining an order of DMA commands associated with the stream ID with respect to one another.

8. The method of claim 1, further comprising maintaining an order of DMA commands associated with the stream ID asynchronously with respect to other DMA commands associated with other stream IDs.

9. The method of claim 1, wherein an input/output controller of the computer system associates the DMA command with the stream identified by the stream ID.

10. The method of claim 9, wherein the detecting and isolating are performed at a memory controller in communication with the input/output controller.

11. A system for isolating errors in a computer system, the system comprising:
    a computer memory; and
    one or more controllers in communication with the computer memory, the one or more controllers configured to perform a method comprising:
        receiving a direct memory access (DMA) command to access a computer memory, a read response, or an interrupt;
        associating the DMA command to access the computer memory, the read response, or the interrupt with a stream identified by a stream identification (ID);
        detecting a memory error caused by the DMA command in the stream, the memory error resulting in stale data in the computer memory; and
    isolating the memory error in the stream associated with the stream ID from other streams associated with other stream IDs upon detecting the memory error.

12. The system of claim 11, wherein the stream ID includes a first bit indicating whether the stream is lock enabled and a second bit indicating whether the stream is in a locked state.

13. The system of claim 12, wherein the method further comprises isolating the memory error in the stream associated with the stream ID from other streams associated with other stream IDs by setting the second bit in the stream ID to a locked state.

14. The system of claim 13, wherein the method further comprises setting the first bit to a lock enable state enabling the second bit to be set to the locked state.

15. The system of claim 13, wherein the method further comprises blocking subsequent DMA commands to access the computer memory, read responses, and interrupts associated with the stream ID in the locked state.

16. The system of claim 13, wherein the method further comprises performing a recovery process on at least one requesting adapter having an adapter ID associated with the stream ID in the locked state while enabling other requesting adapters having other adapter IDs associated with other streams IDs to continue operation.

17. The system of claim 11, wherein a memory controller in communication with the computer memory performs the detecting and the isolating.

18. The system of claim 11, wherein an input/output controller in communication with the memory controller performs the associating the DMA command with the stream.

19. The system of claim 11, wherein the method further comprises maintaining an order of DMA commands associated with the stream ID with respect to one another and maintaining an order of DMA commands associated with the stream ID asynchronously with respect to other DMA commands associated with other stream IDs.

20. A computer program product for dispatching a task in a computer system, the computer program product comprising:
- a non-transitory storage medium readable by a processing circuit and storing instructions for execution by the processing circuit for performing a method comprising:
    - receiving a direct memory access (DMA) command to access a computer memory, a read response, or an interrupt;
    - associating the DMA command to access the computer memory, the read response, or the interrupt with a stream identified by a stream identification (ID);
    - detecting a memory error caused by the DMA command in the stream, the memory error resulting in stale data in the computer memory; and
    - isolating the memory error in the stream associated with the stream ID from other streams associated with other stream IDs upon detecting the memory error.

21. The computer program product of claim 20, wherein the stream ID includes a first bit indicating whether the stream is lock enabled and a second bit indicating whether the stream is in a locked state.

22. The computer program product of claim 21, wherein the method further comprises isolating the memory error in the stream associated with the stream ID from other streams associated with other stream IDs by setting the second bit in the stream ID to a locked state.

23. The computer program product of claim 22, wherein the method further comprises setting the first bit to a lock enable state enabling the second bit to be set to the locked state.

24. The computer program product of claim 22, wherein the method further comprises blocking subsequent DMA commands to access the computer memory, read responses, and interrupts associated with the stream ID in the locked state.

25. The computer program product of claim 22, wherein the method further comprises performing a recovery process on at least one requesting adapter having an adapter ID associated with the stream ID in the locked state while enabling other requesting adapters having other adapter IDs associated with other streams IDs to continue operation.

* * * * *